United States Patent [19]

Visher

[11] 4,375,697

[45] Mar. 1, 1983

[54] SATELLITE ARRANGEMENT PROVIDING EFFECTIVE USE OF THE GEOSTATIONARY ORBIT

[75] Inventor: Paul S. Visher, Malibu, Calif.

[73] Assignee: Hughes Aircraft Company, Culver City, Calif.

[21] Appl. No.: 183,883

[22] Filed: Sep. 4, 1980

[51] Int. Cl.³ .............................................. H04B 7/19
[52] U.S. Cl. ............................... 455/13; 343/100 ST
[58] Field of Search ..................... 343/100 R, 100 ST; 370/104; 455/12, 13, 25, 54, 600, 601

[56] References Cited

U.S. PATENT DOCUMENTS

| | | | |
|---|---|---|---|
| 3,349,398 | 10/1967 | Werth | 343/100 ST |
| 3,706,037 | 12/1972 | Lundgren, Jr. | 455/13 |
| 3,836,969 | 9/1974 | Bond et al. | 343/100 ST |
| 3,852,750 | 12/1974 | Klein | 343/100 ST |
| 4,004,098 | 1/1977 | Shimasaki | 370/104 |

Primary Examiner—Benedict V. Safourek
Attorney, Agent, or Firm—E. F. Oberheim; A. W. Karambelas; N. B. Hammond

[57] ABSTRACT

A satellite squadron or cluster formation is disposed in a predetermined location in the geostationary orbit, including a plurality of controllably maneuverable communication satellites and a centrally located switching and control satellite. The satellites comprise a simulated geostationary communications platform made up of discrete modules which are not physically attached together. The satellites are grouped together in assigned positions in a relatively close formation, and are provided with cross-link intersatellite radio communications. The switching and control satellite detects the relative position of the communication satellites and sends control signals to maintain them in their assigned positions in the formation. Communication signals are relayed from one place on the earth to another via the satellite cluster formation by utilizing the control satellite as a switching satellite. Each satellite has a communications down link providing communications with selected earth stations in a predetermined frequency band. When a signal is received by one of the satellites, it converts the signal to the cross-link frequency band and transmits it to the control satellite, which retransmits the signal to a different satellite, where it is converted to that satellite's down link frequency band, and retransmitted to the earth. In this manner, a signal originating in one continent, for example, may travel to the satellite cluster at one frequency band, and may be relayed to another continent at another frequency band. Thus, all satellite earth stations at their various frequency bands are mutually compatible.

8 Claims, 5 Drawing Figures

SATELLITE ARRANGEMENT PROVIDING EFFECTIVE USE OF THE GEOSTATIONARY ORBIT

BACKGROUND OF THE INVENTION

The present invention relates to communications satellites and, more particularly, to communications satellites in geostationary orbit.

The most desirable orbit for communications satellites is the geostationary orbit 22,300 miles above the earth's surface over the equator, and more than 60 satellites have been launched into that orbit at the present time. The reason for the popularity of the geostationary orbit is that a satellite placed there remains fixed above a selected place on the earth's surface.

Some portions of the geostationary orbit tend to be crowded at certain longitudes because satellites at those locations are in view of portions of the earth's surface involving heavy communications traffic. Such desirable positions are, for example, those over the Atlantic Ocean, the Pacific Ocean, the Indian Ocean and the longitudes that pass through the American Continent. The result is that the most useful geostationary orbit locations are becoming saturated.

There is also a problem with radio frequency congestion. Only certain portions of the radio spectrum are allocated for communication satellite use. When several geostationary satellites operate in the same frequency band, discrimination between the signals from adjacent satellites is achieved primarily by the angular separation between the earth station antennas, thus avoiding mutual interference. Approximately 40° of the geostationary orbit is desirable for North American communications and will permit the use of approximately ten geostationary satellites using the same frequency band and separated in orbit by approximately 4° of orbital arc. The presently orbiting satellites have almost exhausted the available North American orbital slots at C-band (4/6 GHz). However, other satellites can be placed in the same orbital segment at other frequency bands, such as Ku band (11/14 GHz) and Ka band (20/30 GHz).

As is generally well-known, the frequency and orbital position assignments are allocated by an international body, the World Administrative Radio Conference (WARC) of the International Telecommunications Union (ITU). Frequency and orbital congestion have led to problems of allocation among nation. Equatorial nations now wish to claim rights to the portions of the geostationary orbit above their countries, and the underdeveloped countries wish to obtain a portion of the equatorial orbit and the frequency spectrum before it has all been allocated or assigned to the developed countries. Hence, it appears that the situation will become worse in time.

One of the presently proposed solutions to these problems is to place a large structure in space which would provide the equivalent performance or better of a large number of individual satellites. Such a structure has been referred to variously as a space station, a space platform, a switchboard in the sky, an orbital antenna farm (OAF) and a geostationary communications platform. Descriptions of such structures are given in the following articles, amoung others: Edelson, B. I., and Morgan, W. L., "Orbital Antenna Farms," *Astronautics and Aeronautics*, September 1977, pp. 20-27; Fordyce, S. W. and Jaffe, L., "Future Communications Concepts: Switchboard-in-the-Sky," Satellite Communications, February 1978, pp. 22-26, and Mar. 1978, pp. 22-27; and Morgan, W. L., "Space Stations," Satellite Communications, April 1978, pp. 32-39.

In general, such a large space station would be assembled and fastened together into an integral structure in orbit from components ferried into space by a vehicle such as the Space Shuttle. The space station would have a plurality of different transmitters, receivers, and antennas mounted to a common support structure and sharing a common power supply, common support and station keeping apparatus, and the like. In addition, the various transmitters and receivers would be connected by means of waveguides and cables with an on-board signal processor which would provide functions such as switching, demodulation and remodulation, for example. On subsequent visits of the Space Shuttle, additional equipment could be added to increase communications capacity or to provide additional services, failed equipment could be repaired or replaced, and obsolete equipment could be replaced with newer equipment. By the use of large, high gain antennas and special antenna feeds, multiple narrow spot beams could be formed, permitting reuse of the same frequency spectrum without excessive mutual interference.

Clearly, such large space stations are desirable because they would provide all of the communications services presently available from a multiplicity of satellites in orbit, and yet each space station would occupy only a single orbital slot, thereby relieving orbital congestion. The use of large aperture antennas would provide multiple narrow spot beams, and cross-linking by on-board signal processors would permit receiving a signal at one frequency band and retransmitting it at another frequency band, This would alleviate the frequency congestion problem and provide many more communications channels. The system would be repairable, and would be flexible as to adding additional capacity or other types of service.

However, the problem with putting large space stations in orbit is that the presently available technology is not yet adequate to permit the immediate launch of the types of space stations that are presently contemplated. A great deal of design, development and experimentation must be done, particularly in the areas of space transportation systems and the construction or assembly of large objects in space. These developments depend on large investments of funds that are yet to be committed.

OBJECTS OF THE INVENTION

Accordingly, it is an object of the present invention to provide a satellite arrangement having all the advantages of a geostationary communications platform.

Another object of the invention is the provision of a satellite arrangement simulating a geostationary communications platform which utilizes presently available technology.

Yet another object of the present invention is to provide a geostationary satellite arrangement which alleviates the congestion of the orbital space and of the frequency spectrum.

A further object of the invention is the provision of a geostationary satellite arrangement having a long life time in orbit.

A still further object of the present invention is to provide a geostationary satellite arrangement in which failed modules can be replaced.

Still another object of the invention is the provision of a geostationary satellite arrangement whose communications capacity can be easily increased.

Another object of the present invention is to provide a geostationary satellite arrangement having a large number of communications channels.

SUMMARY

In accordance with these and other objects of the invention, there is provided a satellite squadron or cluster arrangement made up of a group of controllably maneuverable communication satellites disposed in a predetermined location in the geostationary orbit. The satellites are grouped together in assigned positions relative to each other to form a cluster of satellites in a predetermined formation. In effect, this satellite arrangement comprises a simulated geostationary communications platform made up of discrete modules which are not physically attached together.

The satellites are kept in a relatively close formation of ½ to ten miles, and are deployed in an elliptical formation off the equator. One of the satellites is a control satellite and is located in the center of the satellite cluster. This arrangement prevents mutual eclipsing or shadowing which might occur if the satellites were disposed in a line along the equator, and permits the control satellite to have a control relationship with all of the satellites in the cluster.

The satellites have communications cross links permitting intercommunication therebetween, and are provided with apparatus for developing error signals at the control satellite indicative of deviations of the satellites from their assigned positions in the formation. The control satellite processes the error signals and transmits command signals over the communications cross links which controllably maneuver the satellites to correct for their deviations from their assigned positions in the formation.

Communication signals are relayed from one place on the earth to another via the satellite cluster formation. Each satellite has a communications down link providing communications with selected earth stations in a predetermined frequency band. When a signal is received by one of the satellites, it converts the signal to the cross link frequency band and transmits it to the control satellite, which retransmits the signal to a different satellite, where it is converted to that satellite's down link frequency band, and retransmitted to the earth. Thus, the control satellite acts as a switching satellite. In this manner, a signal originating in one continent, say Africa, may travel to the satellite cluster in one frequency band, for example C-band, and may be relayed to another continent, say Europe, and may arrive there at another frequency band, for example $K_u$-band. This makes all of the earth stations at their various frequency bands mutually compatible.

The satellites employ large diameter, high gain antennas and multiple anntenna feeds to provide communication via multiple narrow spot beams with many different earth station locations. Thus, many communication channels are provided via a simulated geostationary communication platform at a single location in the geostationary orbit, thereby making effective use of the available orbital slot space and the available frequency spectrum.

BRIEF DESCRIPTION OF THE DRAWINGS

The foregoing and other objects and features of the present invention can be more readily understood with reference to the following detailed description, taken in conjunction with the accompanying drawings, wherein like reference numerals designate like structural elements, and in which.

DETAILED DESCRIPTION

Figure 1:
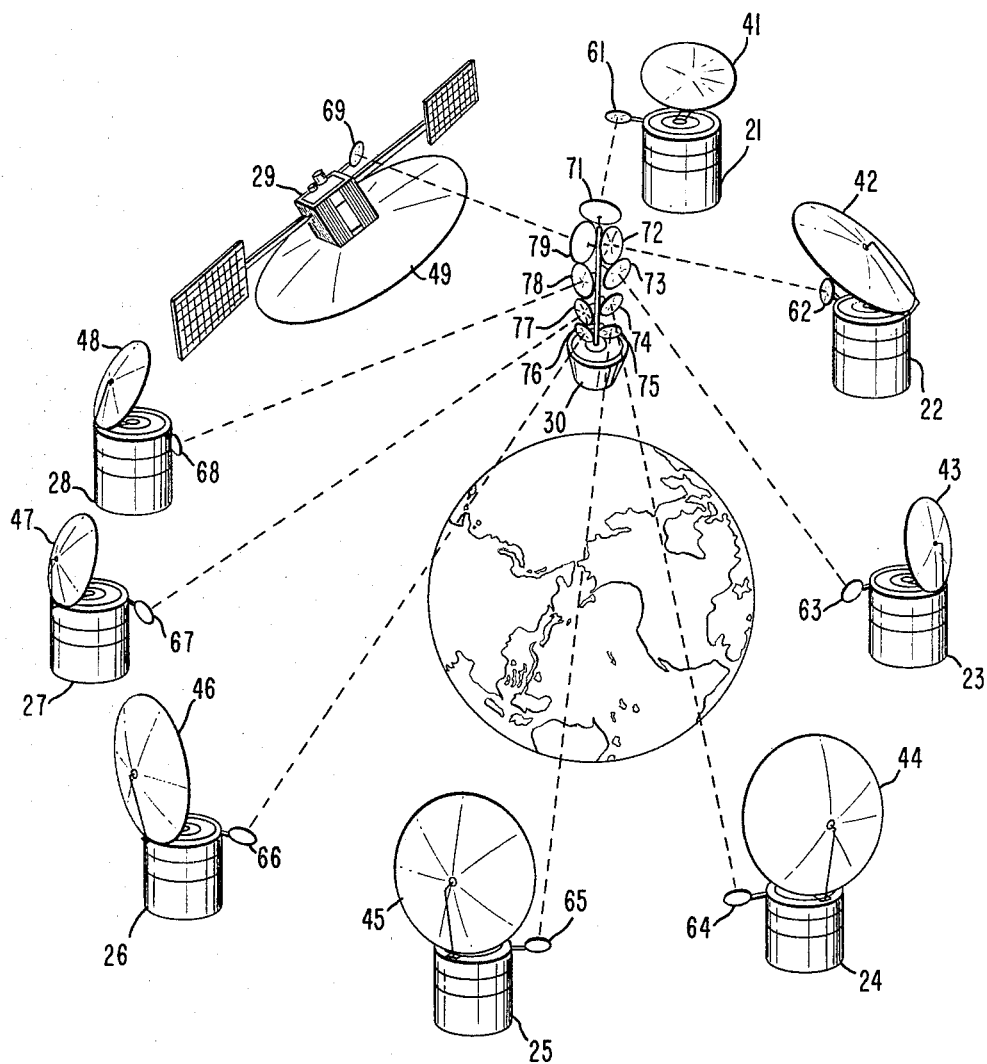
FIG. 1 is a persepective view of a satellite cluster formation in orbit around the earth, including a plurality of communications satellites and a central switching and control satellite.

Since the early days of the space age, it has been desired to employ large antennas on communication satellites. Such antennas provide the advantages that they may be used with low transmitter power and they offer stability and long life. The disadvantage of very large satellite antennas is that at microwave frequencies they cover a very small area from the geostationary orbit. For example, a 30-foot antenna at C-band will cover about a 200 mile radius on the ground, and if a satellite can only service a 200 mile area, no economic gain is realized. One proposed solution is the use of space stations, which would employ many antennas physically connected by large structural members and electrically connected to a large switch by either waveguide or coaxial cable. Information from one beam could be transferred to a beam in any other antenna, e.g., a Rio de Janeiro beam in the South American antenna could be connected to the Rome beam in the European antenna.

These space stations have many very valuable attributes. However, two major factors must be considered in assessing the feasibility of these stations: expense and state-of-the-art technology, which affect both their erection and their repair.

One difficulty of these stations is that their large size and complexity make them very expensive. This expense in turn dictates a requirement for repairability in orbit. One method of repairability might be to fly an astronaut to geostationary orbit to replace electronic modules, propulsion systems, traveling wave tubes, or the like, as they fail. While such stations might be feasible in the future, at the present time there is not even an approved plan to extend the range of the Space Shuttle to geostationary orbit.

A method of erecting a space station has been proposed: build it in low orbit and then, by some undefined propulsion means, fly the space station to geostationary orbit. Even with the problem of construction being solved with astronauts only in low orbit, the space station would involve a continuing need to introduce man into the repair cycle—either flying the station back to low orbit by the same unidentified means, or flying man to geostationary orbit. These costs are large and a many billion dollar program lasting several years would be required for such effort.

The satellite arrangement of the present invention, on the other hand, is feasible today and uses existing technology. A cluster of satellites can be flown to the geostationary orbit and the satellites can be placed in precise relationship to one another, and maintained in that relationship. The satellites, in the cluster would have a variety of separate technical functions. For example, the cluster could include a large C-band satellite with a 30 foot antenna focused at South America, and producing 12 to 24 spot beams with a 200 mile radius, with one spot beam assigned to each country and each spot beam carrying either 500 megacycles of bandwidth at one frequency at one polarization or, if more bandwidth were required, 1000 megacycles would be available for assignment to each major country in South America by employing frequency reuse with orthogonal polarization. Either opposite-hand circular polarization or crossed-linear polarization may be used. This South American satellite module would be connected by a cross link to a nearby switching satellite located perhaps a mile away, for example. The cross link could operate at inter-satellite frequencies about 100 GHz using IMPATT diodes providing milliwatts of power.

Satellites could be spaced apart from each other in distances measured in tenths of miles with relative accuracies measured in yards. During the phase of establishing the cluster and when replacing modules in a cluster, an onboard radar may be used, if desired, when maneuvering a satellite into position and maneuvering another satellite out of position. The radar may be turned off, if desired, when all relative distances are established, and the cluster flown with appropriate inter-satellite ranging information being determined and transferred to the ground for satellite control.

The transmitters on the spacecraft at C-band may be solid state transmitters having output powers measured in tenths of watts. The cross-link transmitter powers are measured in milliwatts. The communication satellites would have a very low power requirement which would eliminate the need for travelling wave tubes and lessen the loads on batteries. Such reduced requirements provide the possibility of 15 to 20 year satellites with an inherent reduction in communications cost. The switching satellite could be replaced every 5 to 7 years to accommodate the traffic growth. There would be no need to replace a communication satellite until its useful life has ended.

One important feature of the satellite arrangement of the present invention is the multiple reuse of frequencies. The World Administrative Radio Conference (WARC) may allot satellite frequencies by orbital slots on a country-by-country basis, although such allocation is not desirable technically. Such a policy results in frequencies being assigned before they are really needed and where they might never be used. This may impose a limit on the number of satellites. But, if the satellite arrangement of the present invention were utilized, each country could have its own orbital slot, and if each were properly used with other satellite clusters, every country would have a guaranteed position in the orbital arc. Proper technology allows for an adequate amount of frequencies in space which reduces the need for an a priori assignment. For example, in a country like the United States, if 30 foot antennas were used on a cluster of three satellites—one each of C-band, Ka-band and Ku-band—and if these frequencies were interconnected at a central switching satellite, in excess of 150,000 megacycles of communication bandwidth would be available at each orbital slot. Such bandwidth, which exceeds our present ability to use it, is derived from only one orbital space. And if more frequency were required, 60-foot antennas could be used within a satellite cluster, thereby doubling the capacity of intra-country communications. If even more frequency were required, laser communications could be used in clear air, and microwave communications could be assigned to areas undergoing rainstorm conditions.

Another feature of the satellite arrangement of the present invention is the capability to replace a single module if it fails. As satellites have become increasingly complex, different frequency bands are usually combined in one satellite. The Intelsat V satellite has three bands, as does the TDRS satellite. The levels of maturity of these bands are different and different failure rates are expected. If the communication functions are broken into separate pieces as is done in the present invention, each module is designed in a fairly simple format consisting of a large simple control system and a large simple antenna, with C-band being provided on one satellite, Ku-band on another and Ka-band on a third. These satellites can be expected to fail in 20, 15 and 10 years. The failed satellite module with a given capability will then be maneuvered to higher orbits and discarded, and a new satellite with that capability installed. Residual capability which still would be available in the remaining satellites, would not become obsolete. If all these frequency capabilities are combined on one satellite, the entire satellite becomes obsolete if one frequency band fails.

The satellite arrangement of the present invention also permits new combinations of different kinds of appropriate technology. Arguments can be made that for certain size antennas and certain kinds of stationkeeping a spinning satellite represents the lowest cost and the longest-lived solution. Others argue that for very large antennas like a 60-foot antenna for maritime, mobile or search-and-rescue services, a body-stabilized configuration is preferred. In a cluster, satellites with both control technologies can be combined without difficulty. The only requirement is that the satellites be basically compatible with each other as far as intercontrol and intercommunication is concerned. A satellite cluster would be indifferent to a mixture of technologies. This concept is particularly appropriate as countries develop different launch capabilities. The size and packaging of the satellites are a function of the launchers which are available. Different countries can specialize in certain types of satellite clusters, thereby giving a better spread of international technical cooperation on the international satellite programs. In the long term, economics will induce specialization. Each country will base its space communications on a cost-competitive solution.

Another important feature of a satellite cluster is its use of a very large antenna which permits the use of much cheaper and more reliable ground stations. One of the causes of failure of the ground stations is the high levels of power which are required for the ground station transmitters. If power is decreased from kilowatts to tens of watts for a channel, cost can be reduced and reliability of the ground stations can be increased.

Satellite clusters also permit a gradual, orderly growth of the system. A need for multiple reuses of C-band can be met before it becomes necessary to add Ku or Ka-band. When Ku and Ka-bands are needed, cluster modules can be added to the system while interconnectivity with all the C-band earth stations is maintained.

In the past 15 years the INTELSAT system has needed five generations of satellites to keep pace with traffic growth, and now the planning for the INTELSAT system is limited by the availability of boosters. Additional orbital slots have been the solution to traffic growh requirements. The difficulty with adding satellite nodes to this system is the dependency of these nodes on additional ground stations. Additional ground stations would be required even for smaller countries whose own traffic demands would be met by the 500 mc bandwidth available at C-band, because a major country has traffic growth saturating the nodes which currently exist.

An arrangement is needed that would allow a country like Brazil, that will have in 1986 about 1000 half circuits, not to have to add another earth station until all thousand megacycles of C-band are utilized in a spot beam to Brazil. If satellite clusters were used, there would be no need for Brazil to invest in additional earth stations for international service until about the year 2000. This is quite a different picture from that presently contemplated as indicated by current planning documents.

The satellite arrangement of the present invention would also permit interreaction between the C-band capacity of a South American satellite and the C-band capacities of African, North American, and European satellites. When the traffic demand between Europe and North America exceeds C-band capabilities, that area could use Ku-band in many spot beams before expanding to Ka-band. A further benefit is that a 50 or 60 foot L-band antenna may be employed to greatly reduce the cost of shipborne terminals and the cost of aero-nautical capability. It would also provide search-and-rescue services which, through an intersatellite link to the switching satellite, would be sent to the appropriate C-band or K-band link to the ground.

In accordance with the present invention, there may be provided a satellite whose sole function would be the interconnection to other satellite clusters; i.e., if traffic were going from Rio to Tokyo, the appropriate path would be from the Rio spot beam to the Atlantic Ocean cluster and then by a satellite cluster-to-cluster link to the Indian Ocean cluster and then down on a spot beam going into the Tokyo area.

Traffic could be interconnected from the Atlantic Ocean cluster to the Pacific Ocean cluster. And a satellite cluster could be employed to provide domestic satellite service for a country like the United States where the interconnection links would not be through ground stations, but through a cluster-to-cluster satellite link to the Atlantic INTELSAT node and then to a down-beam to Europe, Africa, or South America.

The U.S. probably has enough domestic traffic to warrant application of a satellite cluster. Orbital space is becoming congested for U.S. domestic satellite services, at least in the localized areas where orbital slots give much visibility to all 50 states. In the future, these orbital slots should be utilized more efficiently. The satellite cluster clearly provides such potential. Studies have been performed using the 20 to 30 GHz frequencies of Ka-band. The chief difficulty with these frequencies is rain attenuation. With a satellite cluster providing U.S. domestic service there could be a multiple reuse of C-band covering the country in 12 to 14 spot beams, and multiple reuse of Ku and Ka-bands. For critical nodes, the Ka-band could be backed up by Ku and C-bands. When heavy rain ralls in certain portions of the country, all traffic could be transferred to Ka-band for the portion of the country which is rain free, and Ku and C-bands could be used solely for those areas with rain or mist conditions. The synergistic interreaction of the multiple frequencies operating in a cooperative manner in a satellite node of this type could reestablish some economies of scale which have characterized the traditional growth patterns of the telecommunications community.

The satellite arrangement of the present invention uses existing technology to permit an orderly planned growth for a large system such as INTELSAT. The present invention provides significant economies of scale which would permit INTELSAT to provide both domestic and international service with a common system arrangement and a common ground control. The present invention offers the benefit of interconnectivity while retaining the simplicity of replaceable modules. It also permits the orderly inclusion of new frequencies without jeopardizing an entire expensive satellite if the new technology fails. The satellite cluster, although compatible with the European launch vehicle Ariane, is particularly suited to the Space Shuttle and a simple satellite, which can easily carry a 30 foot antenna, point this antenna to 0.01 degrees and be kept on station with 2 or 3 yards of accuracy relative to another satellite. The satellite arrangement of the present invention provides a cost-competitive alternative to fiber optics cable, as well as the flexibility of enormous interconnectivity that cables cannot provide. Satellite clusters permit the solution of future needs with current technology.

Referring now to the drawings, FIG. 1 is a perspective view of an exemplary embodiment of a satellite arrangement in accordance with the invention. It shows a satellite cluster formation in the geostationary orbit, including a plurality of communication satellites 21–29 and a centrally located switching and control satellite 30. The satellites 21–30 comprise the discrete modules of a simulated geostationary communications platform. The satellites 21–30 are disposed in a close relative formation, and are provided with cross-link intersatellite radio communications. The switching and control satellite 30 detects the relative position of the communication satellite 21–29 and sends control signals to maintain them in their assigned positions in the formation. Thus, this virtual or quasi-space station forms a simulated geostationary communications platform in which the discrete modules are not physically attached to a common support structure, do not share common support and housekeeping functions, and are not interconnected by cables and waveguides.

The communication satellites 21–29 are provided with large high gain parabolic antennas 41–49 for downlink communication with selected regions of the earth. The switching and control satellite 30 is also provided with a downlink antenna 50, not shown in FIG. 1. Although the term "downlink" is used for convenience, it should be understood that the communications go both up and down. The communication satellites 21–29 are also provided with small, one-foot diameter parabolic antennas 61-69 for cross link communications with the switching and control satellite 30, which is provided with corresponding cross link antennas 71-79. The dashed lines in FIG. 1 represent the cross link communications signals. This satellite arrangement in a predetermined formation which comprises a simulated geostationary communications platform may be thought of as a satellite squadron, a satellite constellation or a satellite cluster. The satellites 21-30 are kept in a relatively close formation of one-half to ten miles apart to minimize the amount of station-keeping fuel used, and to minimize the amount of radiated RF power necessary over the cross links. This power may be on the order of 0.1 watt at a frequency of 60-100 GHz or above.

As may be seen in FIG. 1, in the exemplary embodiment of the invention, the communication satellites 21-29 are deployed in an elliptical formation off the equator, with the switching and control satellite 30 located in the center of the formation. This prevents the problem of mutual eclipsing or shadowing which might occur if the satellites 21-30 were disposed in a line along the equator. The switching and control satellite 30 must have a control interreaction or relationship with all of the communication satellites 21-29 to maintain coordination of the satellite cluster, both with regard to communication switching and to positional control in the formation.

FIG. 1 shows that one of the satellites 29 is body-stabilized, or three axis stabilized, while all the rest of the satellites 21-28, 30 are spin stabilized. The satellites 21-30 may be either spin-stabilized or body-stabilized or a mix of the two types as long as they are basically compatible with each other as far as intercontrol and intercommunication is concerned.

Each of the communication satellites 21-29 operates in a single down link frequency band to provide a single life maturity for each of the satellites 21-29. Some of the communication satellites 22, 24, 25, 26 operate at C-band and employ 30-foot diameter unfurlable down link antennas 42, 44, 45, 46. Other satellites 21, 23, 27, 28 operate at $K_u$-band and $K_a$-band and have correspondingly smaller antennas 41, 43, 47, 48, fifteen-foot diameter, for example. One of the satellites 29 is provided with a 60-foot antenna 49 for operation at L-band. Such large diameter unfurlable antennas are available from Harris Electronics Systems Div. of Harris Corp., Melbourne, Fla. The down link antennas 41-50 are provided with multiple antenna feeds (not shown) to provide multiple narrow spot beams directed at different earth station locations with a pointing accuracy of 0.01 degrees.

Figure 2:
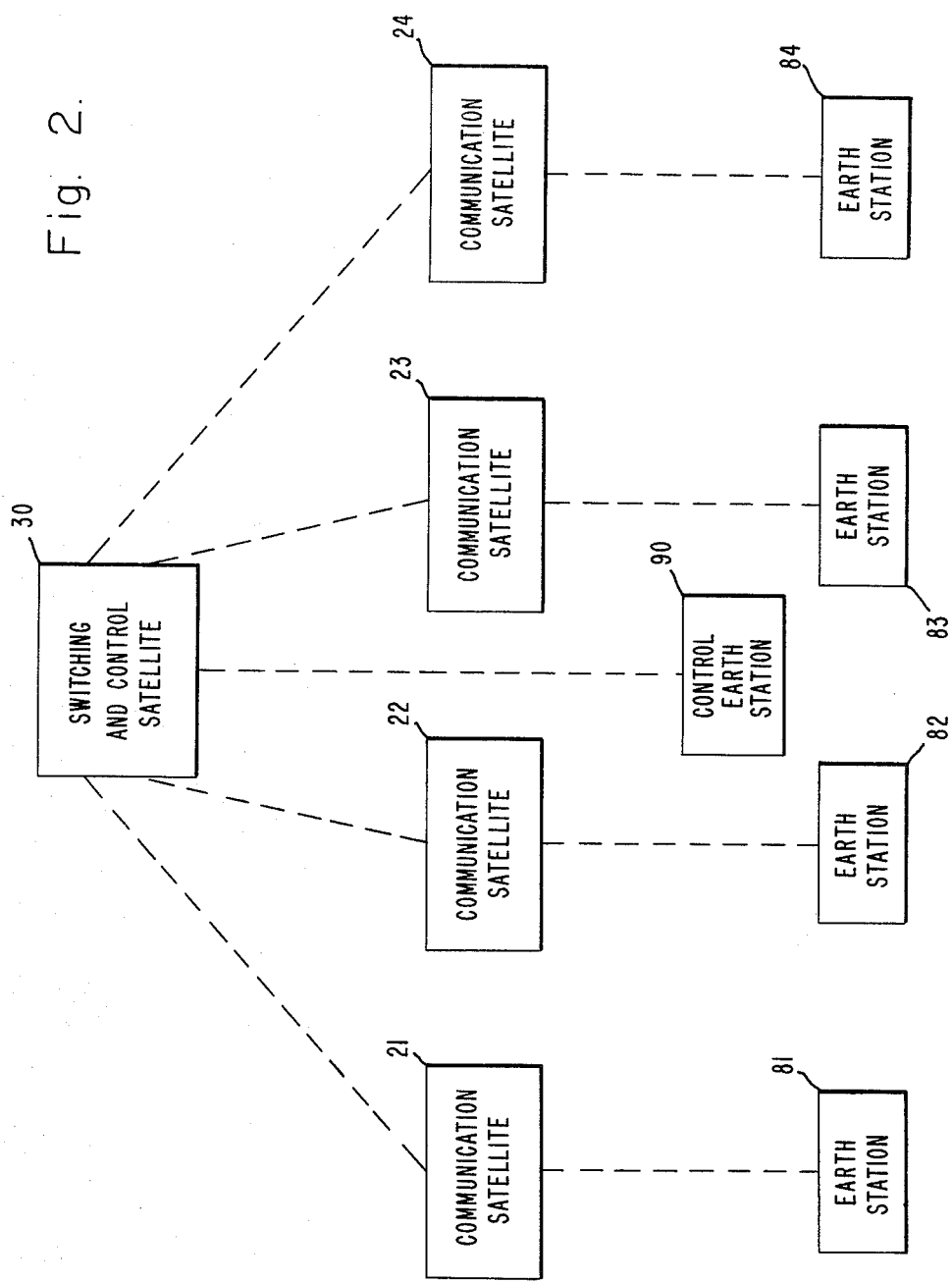
FIG. 2 is a diagram showing communication signals being relayed from one earth station to another via the switching and control satellite which switches the signals from one communication satellite to another.

Referring now to FIG. 2, there is shown the relaying of communication signals from one place on the earth to another via the satellite cluster formation of the present invention. For clarity, only four communication satellites 21-24 are shown, along with the switching and control satellite 30. Four earth stations 81-84 are in radio communication with the communication satellites 21-24 by means of the communication down links, and a control earth station 90 is in communication with the switching and control satellite 30. The vertical dashed lines in FIG. 2 represent down link communication signals, while the oblique dashed lines represent cross link communication signals.

As an example of the operation of the system, information received from earth station 81 by communication satellite 21 is up converted to the cross link frequency and transmitted to the nearby switching and control satellite 30, where it is switched and retransmitted to communication satellite 23. That satellite 23 down converts the signal to its down link frequency band and transmits it to earth station 83. Of course, the particular relay path selected depends upon instructions received by the switching and control satellite 30 from the control earth station 90. This system makes all of the earth stations 81-84 at their various frequency bands mutually compatible. For example, a signal received at the satellite cluster from earth station 84 at C-band may be transmitted to earth station 83 at $K_u$-band.

Figure 3:
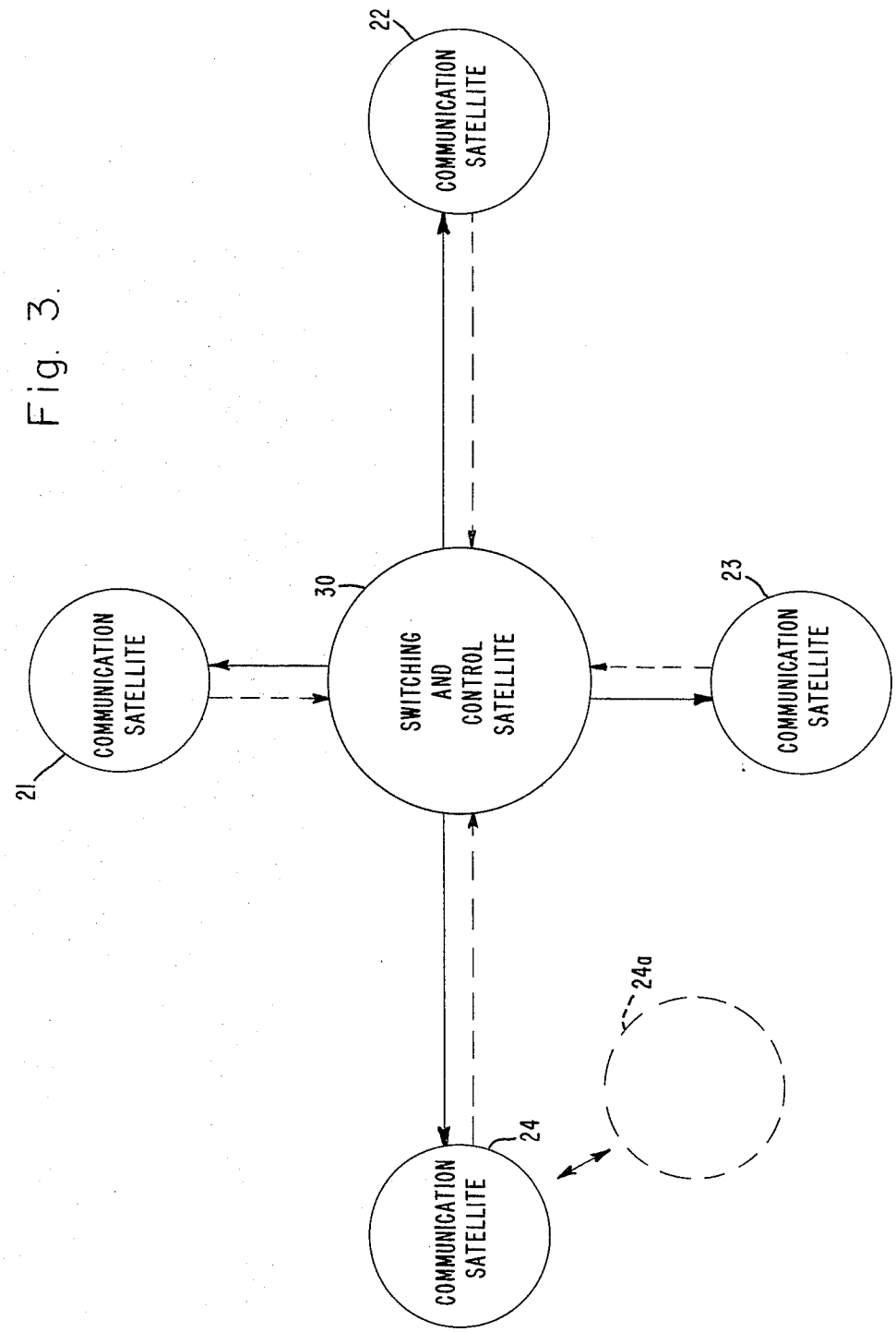
FIG. 3 is a diagram showing how the relative positions of the communication satellites in the satellite cluster formation are controlled by the switching and control satellite.

FIG. 3 shows how the relative positions of the communication satellites 21-29 in the satellite cluster formation are controlled by the switching and control satellite 30. Again, for convenience, only four communication satellites 21-24 are shown. FIG. 3 shows that the switching and control satellite 30 is centrally located in the formation.

The communication satellites 21-24 are kept in formation to an accuracy of ±0.1 degree by means of autoonomous station keeping, that is, commands are not sent from the control earth station 90 for every adjustment of the position of the communication satellites 21-24 in the formation. Instead, the switching and control satellite 30 serves as the reference for navigation of the satellite squadron and for intersatellite referencing, and provides the station keeping commands to the communication satellites 21-24.

In FIG. 3, the straight dashed lines represent position indicating information traveling from the communication satellites 21-24 to the switching and control satellite 30. This position indicating information develops error signals at the switching and control satellite 30 indicative of deviations of the communication satellites 21-24 from their assigned positions in the squadron. The straight solid lines in FIG. 3 represent command signals traveling from the switching and control satellite 30 to the communication satellites 21-24 to correct for the deviations from their assigned positions in the squadron. The satellite 24a drawn in phantom indicates the deviation of satellite 24 from its assigned position in the formation.

Figure 4:
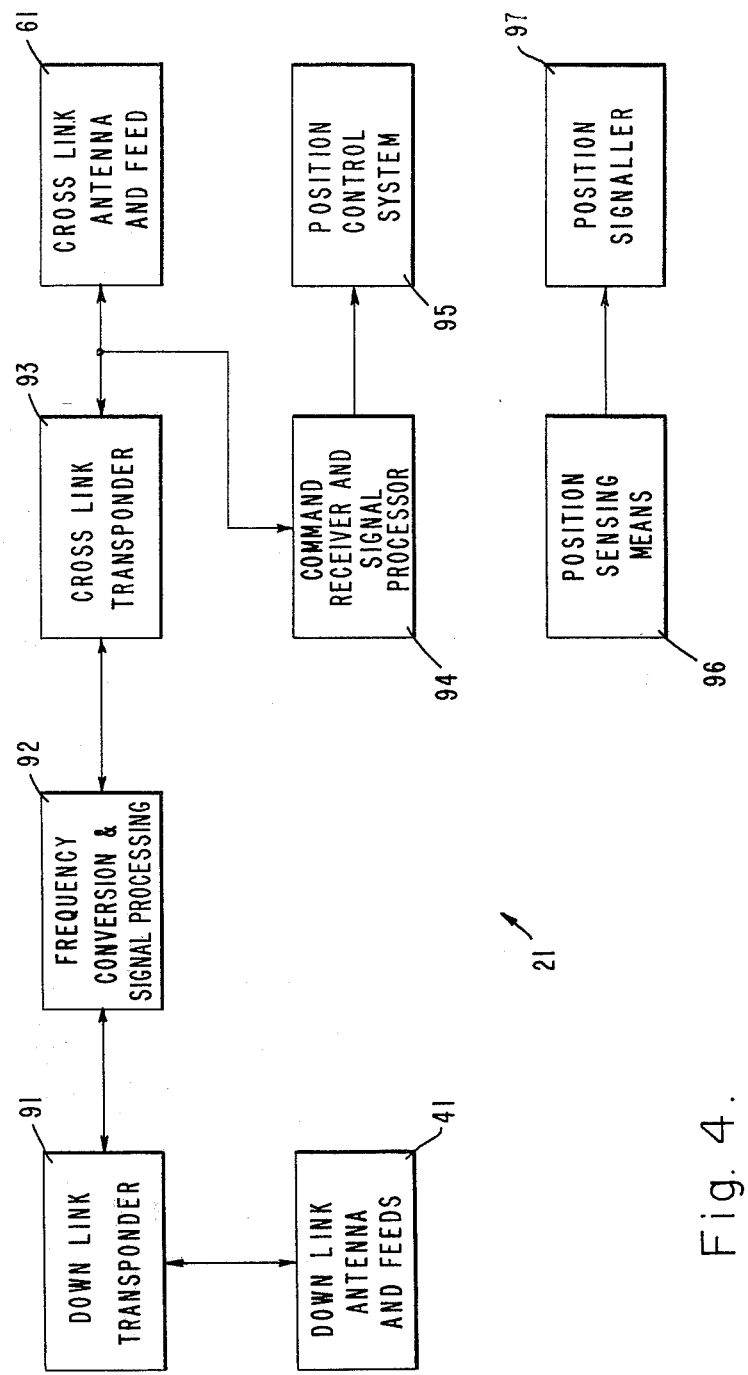
FIG. 4 is a block diagram of the communication apparatus and position controlling apparatus provided in the communication satellites.

FIG. 4 is a block diagram of the communication apparatus and positioned controlling apparatus provided in the communication satellites 21-29. It is illustrated with respect to only one satellite 21, since it is substantially the same for all. The down link antenna 41 and its associated multiple feeds (not shown) is coupled to a down link transponder 91 which receives signals from, and transmits signals to, the earth station 81 (FIG. 2) at the down link frequency. The down link transponder 91 is coupled to a frequency conversion and signal processing circuit 92 which up converts signals at the down link frequency to the cross link frequency, and down converts signals at the cross link frequency to the down link frequency. The frequency conversion and signal processing circuit 92 is coupled to a cross link transponder 93 which receives signals from, and transmits signals to, the switching and control satellite 30 (FIG. 2) at the cross link frequency. The cross link transponder 93 is coupled to the cross link antenna 61 and its associated feed (not shown).

The transponders 91, 93 and frequency conversion and signal processing circuit 92 are conventional and well known. They are small, light, low power, all solid state circuitry not employing electron tubes, such as traveling wave tubes. The down link transponder 91 transmits a one watt signal at the down link frequency, while the cross link transponder 93 transmits a signal of 0.1 watt at a frequency of 60-100 GHz or above. It will be understood that the transponders 91,93 transmit and receive signals over a plurality of communications channels within the frequency band, in accordance with conventional communication satellite practice. Although not shown in the drawings, multiple circuit redundancy is used to extend the useful life time of the satellite 21.

The cross link antenna 61 is also coupled to a command receiver and signal processor 94 which applies position command signals received from the switching and control satellite 30 to a position control system 95. The position control system 95 is conventional and well known, and typically may employ reaction wheels or jet thrusters, or the like, to position the satellite 21. The command receiver and signal processor 94 which applies the command signals to the position control system 95 is also conventional, and is also low power, all solid state circuitry.

For position control, the satellite 21 is provided with position sensing means 96 which is coupled to a position signaller 97 to provide the position indicating information (represented by the straight dashed lines in FIG. 3) to the switching and control satellite 30. The position sensing means 96 measures the relative location of the communication satellite 21 with respect to the switching and control satellite 30 by any well-known means, such as conventional ranging apparatus employing radar or lasar techniques, or the like. The position signaller 97 transmits coding signals, as well as position indicating information, for identification of the particular satellite 21 sending the information. Again, conventional, low power, all solid state circuitry is used for the position control apparatus.

Figure 5:
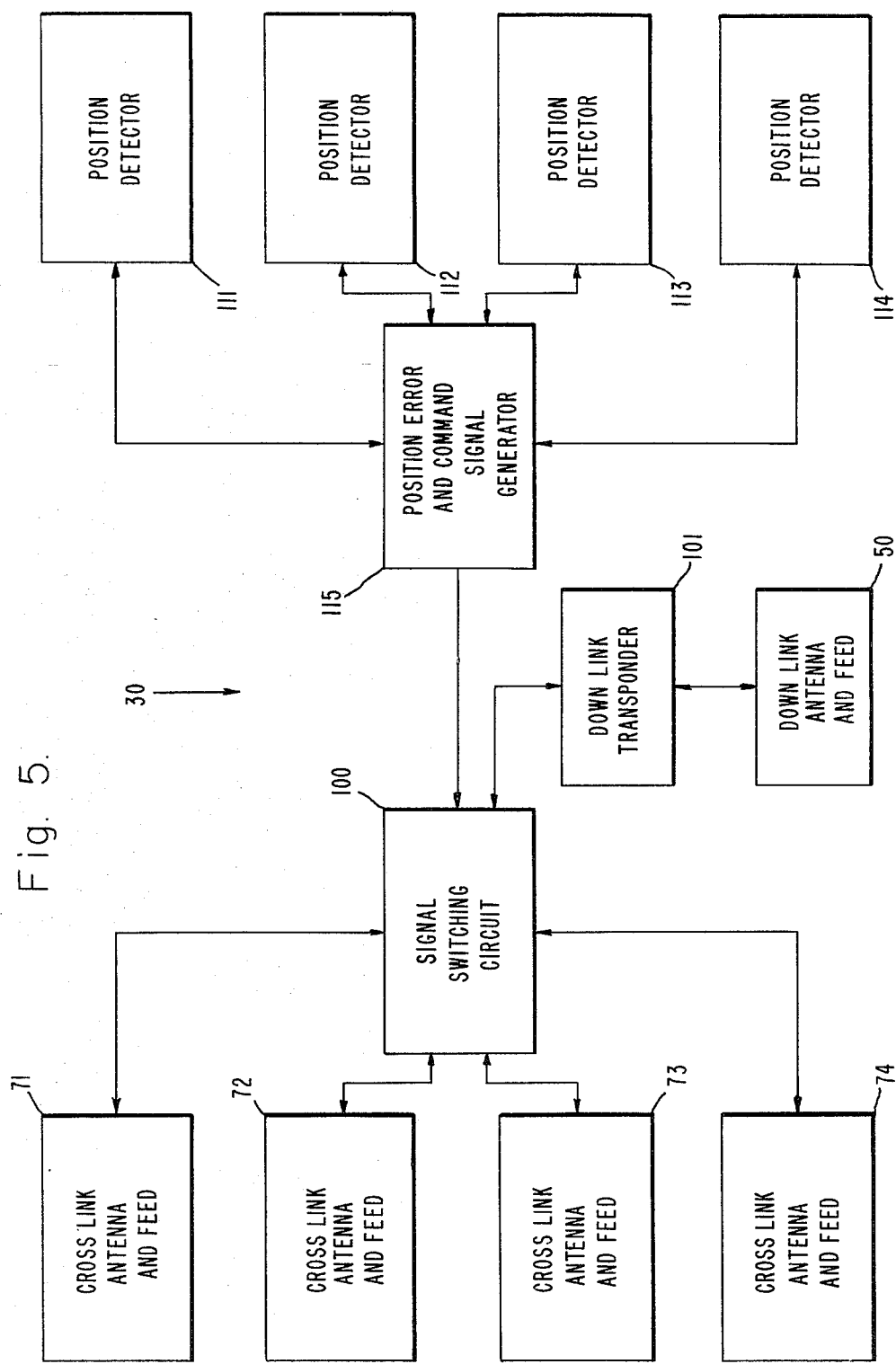
FIG. 5 is a block diagram of the communication apparatus and position controlling apparatus provided in the switching and control satellite.

Referring now to FIG. 5, there is shown a block diagram of the communication apparatus and position controlling apparatus provided in the switching and control satellite 30. It will be understood that the switching and control satellite 30 also has position control apparatus (not shown) of a conventional type to control its own position upon command from the earth.

Signal switching circuits 100 are connected to the cross link antennas 71-74 and interconnect selected ones thereof as determined by commands from the control earth station 90. These commands are received by the down link antenna 50 where they are applied to a down link transponder 101 which is coupled to the signal switching circuits 100. The signal switching circuits 100 and down link transponder 101 are all solid state and require very little power.

The position controlling apparatus for maintaining the communication satellites 21-24 in their assigned positions in the satellite formation comprises four position detectors 111-114 coupled to a position error and command signal generator 115. The position detectors 111-114 receive the position indicating information from the communication satellites 21-24, along with the identification coding signals, and apply the signals to the position error and command signal generator 115. Error signals are developed indicative of deviations of the satellites 21-24 from their assigned positions in the satellite formation, and command signals are transmitted over the communications cross links to controllably maneuver the satellites 21-24 to correct for the deviations. The position controlling apparatus is also all solid state.

The technology of range and position measuring and that of satellite station keeping control are well-developed and well-understood. Accordingly, it is clear that one skilled in the art can easily place the satellites in precise relationship to one another, and maintain them in that relationship.

Large antenna gains due to the large diameter antennas on the satellites lead to the construction of less expensive, more reliable earth stations when new earth stations are needed. The high antenna gains in orbit not only result in a strong received signal at the earth stations (approximately 40 db/m) but also permit the earth station transmitting power to be reduced to approximately 4 watts. Because of the lower transmitting power requirement, the earth station transmitters may be all solid state. By eliminating high power transmitting tubes, the reliability of the earth station transmitters is greatly increased, and the cost is greatly reduced.

The satellite arrangement of the present invention is very flexible. Failed satellites are easily replaced by maneuvering a replacement satellite into the squadron formation, and maneuvering the failed satellite out of it. Commands from the earth cause the formation to oepn up for the replacement maneuver and to close up again afterward. The spare replacement satellite can either be kept in readiness on the earth or in space near the simulated geostationary communications platform. Similarly, out-moded equipment can be replaced with new equipment, the switching capacity can be increased at the various frequency bands, new communications channel capacity can be added, and new types of services can be added. An initial simulated geostationary communications platform comprising 4 communication satellites and a switching and control satellite may be gradually expanded until it comprises 11 communication satellites and a switching and control satellite, for example.

The life time of the satellites and the earth stations is expected to be very long. By eliminating tubes and using low power solid state transmitters, the life time is greatly extended, and is estimated to be from 15 to 20 years. The life time is expected to vary with the frequency band. Because of the light-weight involved, multiple redundancy can be used to extend the life time of the satellites. Due to the small solid state transmitters, receivers and switch on the satellites, additional batteries can be carried, and the batteries can be discharged to a greater depth of discharge. Most of the satellite weight can be allocated to the weight of extra station keeping fuel.

As is apparent from the foregoing, the simulated geostationary communications platform of the present invention employs conventional and well-known technology, and is not dependent on future development in the technology of advanced space transportation systems and the construction of large structures in space. In most respects the satellites are generally conventional. Well-known technology is used for launch and injection into orbit, the orbital position control or station keeping system, the power supply system, the communications transponder circuitry, the provisions for circuit redundancy, the satellite stabilization system, and etc. Among the novel features of the invention is the provision of position measuring and control apparatus which permits the autonomous coordination and control of all of the satellites to maintain them in assigned positions in a squadron or cluster formation. Another feature is the elimination of tubes and the use of small, simple all solid state, low power circuitry, and the use of high gain antennas.

Although it is desirable to launch the satellites in the space shuttle, it is possible to launch the satellites into orbit with conventional rocket boosters used heretofore. The satellite arrangement of the present invention not only alleviates the congestion of the orbital space and of the frequency spectrum, it also provides up to 2 million communication circuits.

As an example of the flexibility and expandability of the system, the initial system may comprise a cluster of 4 communication satellites and a switching and control satellite disposed in a cluster formation over the Atlantic Ocean basin. The communication satellites are provided with C-band antennas, and each antenna is directed at a different continent, one for North America, one for South America, one for Africa and one for Europe. Each of the communication satellites reuses the frequencies 10 times, with beams directed toward different countries in each continent for a total of 20,000 mc of useful C-band capacity at one orbit location.

When the C-band capacity is saturated, $K_u$-band satellites and a $K_u$-band switch are added to the cluster to provide another 10 channels in both Europe and the United States. By means of the switching and control satellite, all of the $K_u$-band channels are interchangeable with all of the C-band channels. In other words, all of the additional 10Kmc of bandwidth at $K_u$-band from Europe and the United States can be interconnected with the 10Kmc bandwidth of Africa and South America at C-band without the need for any additional earth stations in either South America or Africa.

Similarly, upon saturation of the C and $K_u$-bands, $K_a$-band satellites and a $K_a$-band switch are added for North America and Europe for an additional 10,000 mc of communication bandwith. As the need for additional capacity arises, the $K_a$-band may be reused, with the system in balance between C-band uses, $K_u$-band uses, and $K_a$-band uses.

A satellite having a 30 or 60 foot L-band antenna may be added to the cluster for maritime and aeronautical services. The L-band signals may be retransmitted to earth stations at either C or $K_u$-band, depending on preference.

Similar satellite clusters may be provided over the Pacific Ocean basin and over the Indian Ocean basin. To provide complete flexibility, an additional satellite may be added to each cluster to provide cross links between clusters over the Atlantic Ocean basin, the Pacific Ocean basin, and the Indian Ocean basin. Such cross links provide interconnection of all the ocean basin clusters by means of direct links through space without the need for cluster hopping by way of earth stations.

Satellite clusters may also be provided for domestic service, and if inter-cluster satellites are added, domestic system clusters may be directly linked to regional system clusters and to transoceanic clusters.

It will be apparent that many variations may be made. For example, laser communications systems may be used in the satellite arrangement of the present invention instead of radio communications systems. Also, more than one switching and control satellite may be provided in the satellite cluster formation if desired, or one of the communication satellites may also serve as a switching and control satellite, which would eliminate the necessity of having a separate switching and control satellite.

Although the exemplary embodiment of the present invention has the satellites grouped in an elliptical formation with the control satellite in the center, the invention is not limited to that particular formation, and other satellite arrangements may be employed, if desired. For that matter, the invention is not limited to use in the geostationary orbit, either. It may be employed in other orbits, for example orbits inclined to the equator or orbits higher or lower than the geostationary orbit.

The relative position of the satellites in the formation may be either autonomously controlled by the control satellite or the relative position information may be telemetered to earth and control exercised from their, either by directly commanding each individual satellite or by sending the commands through the control satellite.

Thus, there has been described a satellite arrangement having all the advantages of a geostationary communications plateform. The simulated geostationary platform of the present invention employs presently available technology, and alleviates the congestion of the orbital space and the frequency spectrum. This geostationary satellite arrangement has a long life time in orbit and is flexible and expandable. Failed modules can be easily replaced, and the communications capacity can be easily increased to provide up to 2 million communications channels.

It is to be understood that the above-described embodiments of the invention are merely illustrative of the many possible specific embodiments which represent applications of the principles of the present invention. Numerous and varied other arrangements can be readily devised in accordance with these principles by those skilled in the art without departing from the spirit and scope of the invention.

What is claimed is:

1. A satellite arrangement comprising:
   a plurality of controllably maneuverable satellites disposed at a predetermined location of a geostationary orbit;
   said satellites being grouped in assigned positions relative to each other to form a cluster of satellites at said location in a predetermined formation;
   at least one of said satellites being a control satellite and the remainder of said satellites being communications satellites;
   means on said satellites providing communication across links between said satellites for providing intercommunication between said control satellite and each of said communications satellites at selected cross link frequencies;
   means on said control satellite for detecting errors in the position of individual communication satellites relative to said control satellite and for controlling the position of each communication satellite, over said communication cross links, to maintain said predetermined formation;
   communications down link means disposed on said satellites for providing intercommunication with selected earth stations at selected down link frequencies;
   means disposed on said satellites for interconnecting said communications down link means with said communications cross link means, including means for converting between said down link frequencies and said cross link frequencies; and
   means disposed on said control satellite for relaying cross link signals received from one of said communications satellites to selected different ones of said communications satellites.

2. The satellite arrangement of claim 1 in which said communications down link means includes a large aperture high gain antenna and a multiplicity of antenna feeds to provide a plurality of narrow spot antenna beams for each of said communications satellites.

3. The satellite arrangement of claim 2 in which said communications down link means and said communications cross link means include solely solid state circuits.

4. The satellite arrangement of claim 3 in which said communications down link means and said communications cross link means include transmitters of solely low power output.

5. A simulated geostationary communications platform comprising:
a plurality of controllably maneuverable communications satellites disposed at a predetermined location of a geostationary orbit, said communications satellites being provided with means for communicating with selected earth stations over communications down links at selected down link frequencies;
at least one switching and control satellite disposed among said communication satellite at said predetermined location of said geostationary orbit;
said communications satellites and said switching and control satellite being provided with means for communication between said switching and control satellite and each of said communications satellites over individual communications cross links at selected cross link frequencies, each of said communications satellites being provided with means for converting signals between said down link frequencies and said cross link frequencies, said switching and control satellite being provided with controllable means for selectively relaying cross link signals received from one said communications satellites to selected ones of said other communications satellites;
position error detecting means coupled to said individual communication cross links; and
means on said switching and control satellite responsive to said position error detecting means for transmitting position command signals on said individual communication cross links to maneuver and group said communications satellites relative to said switching and control satellite to form a cluster of satellites in a predetermined formation.

6. A satellite arrangement comprising:
a plurality of controllably maneuverable communications satellites and a control satellite adapted to be disposed at a predetermined location of a geostationary orbit in assigned positions in a predetermined formation to form a cluster of satellites at that location;
means providing communication cross links disposed on said satellites for providing intercommunication between said control satellite and each of said communications satellites at selected cross link frequencies;
said control satellite controlling the individual spatial positions of said communication satellites relative to said control satellites over said communication cross links to maintain said satellites in said predetermined formation;
communications down link means disposed on said satellites for providing intercommunication with selected earth stations at selected down link frequencies;
means disposed on said satellites for interconnecting said communications down link means with said communications cross link means, including means for converting between said down link frequencies and said cross link frequencies; and
means disposed on said control satellite for relaying cross link signals received from one of said satellites to selected ones of said other satellites.

7. A simulated geostationary communications platform comprising:
a plurality of controllably maneuverable earth transmit/receive satellites adapted to be disposed at a predetermined location in the geostationary orbit;
a switching and control satellite located at said predetermined location in the geostationary orbit;
said earth transmit/receive satellites and said switching and control satellite being disposed relative to each other to form a cluster of satellites in a predetermined formation;
each of said earth transmit/receive satellites being provided with a radio communications cross link with said switching and control satellite in at least a first predetermined cross link frequency band, said communications cross link comprising directive antennas, low power solid transmitters, and solid state receivers;
ranging and position detecting means disposed on said switching and control satellite for detecting the location of each of said earth transmit/receive satellites relative to said switching and control satellite;
command means disposed on said switching and control satellite and responsive to said ranging and position detecting means for providing correction signals to said earth transmit/receive satellites via said communications cross link to control and maintain each of said earth transmit/receive satellites in its assigned position in said predetermined formation; and
each of said earth transmit/receive satellites being provided with a communications down link in at least a second predetermined frequency band, said communications down link comprising a high gain antenna, a plurality of low power solid state transmitters, a plurality of antenna feeds, and a plurality of solid state receivers.

8. A satellite squadron arrangement comprising:
a plurality of controllably maneuverable satellites adapted to be disposed in a predetermined orbit, said satellites being grouped in assigned positions relative to each other to form a cluster of satellites in a predetermined formation, at least one of said satellites being a control satellite;
communications cross link means disposed on said satellites for providing intercommunication therebetween;
means for developing error signals at said control satellites indicative of deviations of said satellites from their assigned positions in said predetermined formation; and
means disposed on said control satellite and responsive to said last-named means for developing command signals for transmission over said communications cross link means to controllably maneuver said satellites to correct for said deviations and maintain said satellites in said positions in said predetermined formation.

* * * * *